United States Patent Office 2,978,633
Patented Apr. 4, 1961

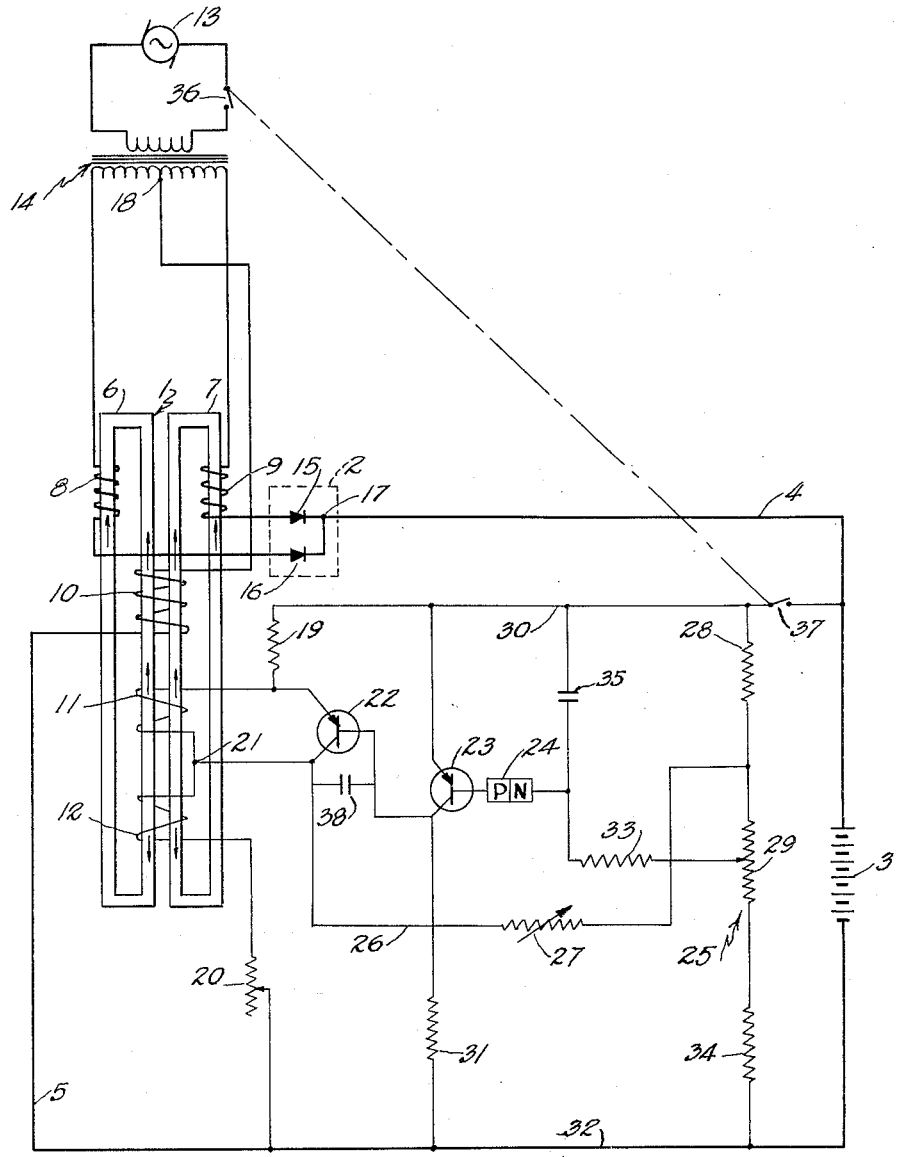

2,978,633

ELECTRICAL CONTROL SYSTEMS

Lewis A. Medlar, Oreland, Pa., assignor to Fox Products Company, Philadelphia, Pa., a corporation of Pennsylvania Filed June 12, 1959, Ser. No. 820,032

3 Claims. (Cl. 323—89)

This invention relates to electrical control systems and more particularly to such systems comprising an electromagnetic control device having a control winding, and an energizing circuit for the winding including a transistor so connected as to be subjected to sudden voltage changes in the control winding.

While not limited thereto, the invention is particularly applicable to control systems employing an electromagnetic device of the type wherein harmonic voltages are induced in the control winding during operation. A common example of such an electromagnetic control device is the saturable reactor. When a saturable reactor absorbs voltage during operation, alternating voltages are induced in the control coil or coils, the induced voltage comprising components having the fundamental frequency of the gate or load current and harmonics thereof. The fundamental frequency component is inherently cancelled out, but the harmonic voltages remain and must be dealt with in any control circuit connected to energize the control winding or windings.

While, in many types of control circuits which might be employed to energize the control winding of such a device, the presence of the induced harmonic voltages would present no unusual problem, particular difficulty arises if the circuit employed to energize the control winding includes a transistor having its emitter and collector connected in series with the control winding, or one of the windings when plural windings are used, the base potential of the transistor being controlled by direct current circuit means. In such an arrangement, the transistor tends to block currents resulting from the harmonic voltages induced in the control winding unless some means is provided for establishing a small flow of alternating current, proportional to the harmonic. In order that the direct current circuit means shall properly control the operation of the transistor, it is obvious that alternating currents must not be introduced therein. Since the induced harmonic voltages can be of very considerable magnitude, the transistor employed in the circuit for energizing the control winding is subject to damage unless suitable provision is made to allow harmonic current flow in the emitter-to-base circuit of the transistor.

The invention is also applicable to electrical control systems of the general type referred to and wherein the electromagnetic device is one in which, as in the case of a relay, there is a sudden voltage surge induced in the control winding upon occurrence of a sudden change in control current.

A general object of the invention is to provide, in such control systems, means allowing the transistor to pass without damage currents resulting from sudden voltage changes in the control winding.

Another object is to provide, in a battery charger having a charging circuit controlled by an electromagnetic device, such as a saturable reactor or a relay, having a control winding, D.C. circuit means connectable to the battery being charged and operative to energize the control winding, such circuit means including a transistor having its emitter and collector connected in series with the control winding, operation of the transistor being effected in response to changes in the terminal voltage of the battery and provision being made to allow the transistor to pass, without damage, currents resulting from voltage fluctuations in the control winding.

In order that the manner in which these and other objects of the invention can be understood in detail, reference is had to the accompanying drawing, which forms a part of this specification, and wherein the single figure is a circuit diagram of a battery charger constructed in accordance with one embodiment of the invention.

Referring now to the drawing in detail, it will be seen that this embodiment of the invention employs a saturable reactor 1 and a rectifier 2, arranged to control the charging current delivered to battery 3 via conductors 4 and 5. Saturable reactor 1 comprises two closed, saturable cores 6, 7 of magnetic material, the outer leg of each core carrying an impedance or gate winding as indicated at 8 and 9, respectively. A feedback coil 10 is wound on both inner legs of the cores, as are also two control windings 11 and 12. Control windings 11, 12 are series connected, oppositely wound and, in this embodiment, have substantially the same number of turns.

Supply current is derived from any suitable A.C. source 13 via transformer 14, one terminal of the secondary winding of the transformer being connected to a terminal of winding 8 and the other secondary winding terminal being connected to a terminal of winding 9. The other terminals of windings 8 and 9 are connected via rectifying elements 15 and 16, respectively, to the positive terminal 17 of rectifier 2. Conductor 4 leads directly from positive terminal 17 of the rectifier to the positive terminal of battery 3, while conductor 5 is connected between the negative terminal of battery 3 and center tap 18 of the secondary winding of transformer 14. Feedback coil 10 is connected in series in conductor 5.

As indicated by the arrows, and giving attention to the action of rectifier 2, the magnetomotive forces resulting from the current flowing in windings 8 or 9 oppose the magnetomotive forces resulting from current flow in windings 10 and 11 but aid the magnetomotive forces resulting from current flow in coil 12.

Constancy of charging current is attained as a result of operation of the saturable reactor in a servo system fashion, the magnetomotive force generated by negative feedback coil 10, viewed as the "output," being compared with the net magnetomotive force generated by control coils 11, 12, the overall net magnetomotive force determining the degree of saturation of the reactor and hence determining the output current supplied to the rectifier.

Control coils 11, 12 are connected across the rectifier output, and thus across battery 3, in series opposition. One terminal of winding 11 is connected to conductor 4 via a small resistance 19, while one terminal of winding 12 is connected to conductor 5 via a rheostat 20. The other terminals of the two control coils are connected together, as at 21. Considering only those circuit portions just mentioned, it is obvious that the battery voltage would cause current to flow through the two control windings in series, providing a definite net control magnetomotive force, since the series combination of the control windings, resistance 19 and rheostat 20 is connected across the battery.

Connected in shunt relation with control winding 11 is a transistor 22, forming part of a control circuit including as its main elements a second transistor 23, a Zener diode 24 and a voltage divider indicated generally at 25. Transistors 22, 23 are both of the P-N-P type and each includes an emitter, a collector and a base. As will be seen, the transistors 22, 23 are employed as switching devices to selectively shunt certain of the circuit elements. The emitter of transmitter 22 is connected to a point between coil 11 and resistance 19, while the collector is connected to junction point 21 between the two control coils, and also, via conductor 26 and adjustable resistance 27, to the junction point between a resistance 28 and the potentiometer 29 of the voltage divider 25.

The emitter of transistor 23 is connected to conductor 30 at a point between resistance 19 and the positive terminal of the battery, while the collector of that transistor is connected, via resistance 31, to conductor 5 at a point between rheostat 20 and the negative terminal of the battery. The base of transistor 22 is connected directly to the collector of transistor 23. The base of transistor 23 is connected, via Zener diode 24 and a resistance 33, to the adjustable contact of potentiometer 29 of the voltage divider.

The voltage divider is completed by a resistance 34 connected between potentiometer 29 and conductor 5. Resistances 28, 34 and potentiometer 29 can be of any values required for derivation from battery 3 of the proper operating voltage of the Zener diode. A fixed condenser 35 is connected between conductor 30 and the juncture between diode 24 and resistance 33. Manual switch 36 is provided in series with the primary winding of transformer 14, and a like switch 37 is provided in conductor 30 adjacent the battery, the two switches being ganged so that both are opened and closed together.

Zener diode 24 is so poled as to receive current from the battery only in the inverse (high resistance) direction. So long as the terminal voltage of the battery is below a predetermined value (to which the control circuit is to respond to reduce the charging current) the voltage applied to the Zener diode is inadequate to cause the diode to conduct. However, when the battery voltage reaches the predetermined value, the voltage applied to the Zener diode is adquate to cause the same to conduct in its inverse direction. Once the diode is made conductive in this fashion, the voltage drop thereacross remains substantially constant, regardless of variation of the current through the diode.

Assuming that switches 36 and 37 are closed and that the battery voltage is below the predetermined value to which the control circuit is to respond, transistor 23 is fully nonconductive and transistor 22 is fully conductive. Since transistor 22 shunts control coil 11, the full control current flow through coil 12. Hence, the net magnetomotive force from the control coils is at a miximum, and the charger supplies its maximum output to the battery, the charging current remaining substantially constant regardless of line voltage variations, due to the magnetic servo action hereinbefore described.

As charging proceeds, and the battery voltage increases, the voltage derived via voltage divider 25 and applied to the Zener diode 24 increases until the battery voltage reaches the critical value. Diode 24 then becomes conductive. At the instant diode 24 becomes conductive, the current therethrough is just sufficient to make transistor 33 conductive.

The value of resistance 31 is so selected that the potential at the base of transistor 22 is at the edge of saturation for the transistor. Hence, a slight flow of current through transistor 23 causes the emitter-to-base potential of transistor 22 to decrease, resulting in a decrease in conductivity of transistor 22.

Conductor 26 and resistance 27 form a positive feedback circuit such that, as transistor 22 becomes less conductive, less current flows through resistance 27, and a greater voltage is accordingly applied, via voltage divider 25, to Zener diode 24. The emitter-to-collector current of transistor 23 therefore increases still further, resulting in a further decrease in the potential at the base of transistor 22. Transistor 22 is thus positively caused to become completely non-conductive and is therefore no longer effective to shunt control coil 11.

Current from the battery now must flow through both control coils 11 and 12 in series and, since these coils are in opposition, their net magnetomotive force is greatly diminished. The magnetomotive force of feedback coil 10 must follow that of the control coils and therefore also is greatly diminished. Accordingly, the charging current to the battery is reduced.

Rheostat 20 is provided as a means for adjusting the current in control coil 12 when transistor 22 is fully conductive and therefore effective to shunt coil 11. Such adjustment allows the operator to select the value of the rectifier output current.

Use of relatively small resistance 19 assures that the emitter of transistor 22 will be negative with respect to the base when transistor 23 is conductive, thus making certain that transistor 22 will become fully non-conductive at the desired time.

It will be understood that the voltage at the battery terminals is a pulsating voltage, due to operation of rectifier 2. The control circuit comprising voltage divider 25, diode 24, and transistors 22, 23 is very sensitive, sufficiently so that, when the battery voltage approaches its desired value, a single voltage pulse causes the Zener diode to become conductive and transistor 22 to be made non-conductive. Since the amplitude of the pulsating voltage at the battery terminals varies with line voltage, and because of the sensitivity of the control circuit, there is a tendency for the voltage cutoff to vary with line voltage. Accordingly, condenser 35 is provided to filter voltage pulses from the control circuit.

In operation, as the saturable reactor 1 absorbs voltage, alternating voltages are induced in control coils 11 and 12, such voltages including components having the fundamental frequency of the current flowing in gate coils 8 and 9 and harmonics thereof, the fundamental frequency component being cancelled inherently in the magnetic circuit but the harmonic components remaining. Windings 11 and 12 having equal numbers of turns and being oppositely poled, the harmonic voltages generated therein are equal and opposite. As to the circuit comprising conductor 30, battery 3, conductor 32 and the two windings in series, harmonic currents cannot flow because the harmonic voltages in the two windings are always equal and opposite. Transistor 22, being connected across winding 11 and in series with winding 12 is, however, subject to the harmonic voltages generated in coil 12 and tends to block the flow of current resulting from such voltages.

It is a characteristic of transistors that current can flow in the emitter-collector circuit only when a smaller, proportional current flows in the emitter-base circuit. Considering only circuit elements so far described, the harmonic voltages generated in winding 12 do not appear in the emitter-base circuit of transistor 22, hence current from a harmonic voltage in winding 12 cannot flow in the emitter-collector circuit of the transistor and, if the harmonic voltage is sufficiently high, the transistor will be damaged.

For this reason, a capacitor 38 is connected between the collector and the base of transistor 22. Capacitor 38 provides a path by which alternating currents, such as those tending to flow because of induced electric voltages in control coil 12, can flow in the emitter-base circuit of transistor 22. Thus, as to alternating current, there is a complete circuit from the emitter to the base of transistor 22, thence via capacitor 38 through control coil 12 and thence through battery 3, via rheostat 20 and conductor 32, to the emitter of transistor 22 via conductor 30 and resistance 19. The flow of a small "pilot" current in this complete circuit, made possible by capacitor 38, opens up the emitter-collector of the circuit of the transistor to heavier current flow. Such heavier current flow is from emitter to collector, through coil 12, through battery 3 and back to the emitter, this circuit being of low enough impedance to allow sufficient current flow to dissipate the harmonic voltages.

While a complete emitter-base-capacitor circuit portion is provided, it will be understood that direct current from the control circuit is excluded from such circuit portion, because of the capacitor, and use of this feature accordingly does not disturb the D.C. balance of the control circuit.

It will be noted that, should the harmonic currents be allowed to flow in the feedback circuit comprising conductor 26 and resistance 27 and therefore enter the voltage divider, and should the battery voltage then be approaching the predetermined value for which the control circuit is designed to respond, presence of the harmonic current in the voltage divider circuit would cause peaks of voltage to be superimposed on the D.C. voltage derived from the battery, which peaks would cause the control circuit to operate, to make transistor 22 non-conductive, before the battery voltage reached the desired predetermined value. Since the harmonic voltage induced in the control coils varies with line voltage, it is obvious that the "cutoff point" of the circuit would now depend undesirably on line voltage. Such disadvantage is completely avoided because the capacitor 38 is effective to substantially completely suppress the harmonics.

As fully described in my copending application, Serial Number 820,031, filed concurrently herewith, windings 11 and 12 can constitute the control windings of a relay having contacts in the charging circuit, rather than being the control windings of a saturable reactor. Also, as described in said copending application, the suppression capacitor 38 can be used, in accordance with the invention, in connection with a single control winding. Such an arrangement is advantageous, for example, when the voltage of the battery being charged is lower than that of the transistors, so that the dual control windings are not required. Employed with a single control winding, the action of capacitor 38 is as hereinbefore described.

What is claimed is:

1. In combination in an electrical control system comprising an electromagnetic control device including a control winding in which sudden voltage changes occur during operation of the control device, a circuit connected to said control winding to energize the same, said circuit comprising a transistor having an emitter, a base and a collector, said control winding being connected in said circuit in series with the emitter and collector of said transistor and said transistor thus being so connected as to block currents tending to flow because of sudden voltage changes occurring in said control winding, direct current circuit means connected to the base of said transistor, said circuit being adapted for connection to a direct current source and said circuit means being operative to control the potential of the base of said transistor and so control operation of the transistor, and a capacitor connected between the collector and base of said transistor and effective to allow a relatively small current to flow from the emitter to the base of said transistor in response to occurrence of a sudden voltage change in said control winding, such current flow being effective to render the emitter-to-collector circuit of said transistor conductive to current resulting from said sudden voltage change.

2. In an electrical control system, the combination of an electromagnetic control device including a control winding in which harmonic voltages are induced during operation of the device, a first circuit to be connected across a source of varying D.C. voltage; a voltage divider connected across said first circuit and having an output terminal; first and second transistors each having an emitter, a base and a collector, the control winding of said control device being connected in said first circuit in series with the emitter and collector of said first transistor, the emitter and collector of said second transistor being connected across said first circuit, the base of said first transistor being connected to the collector of said second transistor; a voltage reference device, the base of said second transistor being connected to the output terminal of said voltage divider via said voltage reference device; feedback circuit means connecting the collector of said first transistor to a point on said voltage divider spaced electrically from said output terminal; and a capacitor connected between the base and collector of said first transistor and effective to allow a relatively small flow of alternating current in the emitter-base circuit of said first transistor when a harmonic voltage is induced in said control winding, whereby said first transistor is made conductive to allow flow of harmonic currents in said first circuit.

3. In an electrical control system, the combination of an electromagnetic control device including a control winding in which harmonic voltages are induced during operation of the device; a first circuit to be connected across a source of varying D.C. voltage; a transistor having an emitter, a base and a collector, the control winding of said electromagnetic control device being connected in said first circuit in series with the emitter and collector of said transistor and said transistor thus being so connected as to block currents tending to flow because of harmonic voltages occurring in said control winding; circuit means connectable across such source of varying D.C. voltage and operative to derive therefrom a reference voltage dependent upon the magnitude of the voltage of such source, control circuit means connected to said first circuit means to respond to the reference voltage provided thereby, said control circuit means being operatively connected to the base of said transistor to control the same in accordance with said reference voltage; and a capacitor connected between the collector and the base of said transistor and effective to allow a relatively small flow of alternating current in the emitter-base circuit of said transistor when a harmonic voltage is induced in said control winding, whereby said transistor is made conductive to allow flow of harmonic currents in said first circuit.

References Cited in the file of this patent

UNITED STATES PATENTS

| | | |
|---|---|---|
| 2,751,545 | Chase | June 19, 1956 |
| 2,759,142 | Hamilton | Aug. 14, 1956 |
| 2,875,395 | Blashfield | Feb. 24, 1959 |
| 2,896,149 | Lowery et al. | July 21, 1959 |